(12) United States Patent
Tsafrir et al.

(10) Patent No.: US 9,195,550 B2
(45) Date of Patent: Nov. 24, 2015

(54) METHOD FOR GUARANTEEING PROGRAM CORRECTNESS USING FINE-GRAINED HARDWARE SPECULATIVE EXECUTION

(75) Inventors: Dan Tsafrir, Rehovot (IL); Robert W. Wisniewski, Ossining (IL)

(73) Assignee: International Business Machines Corporation, Armonk, NY (US)

( * ) Notice: Subject to any disclaimer, the term of this patent is extended or adjusted under 35 U.S.C. 154(b) by 407 days.

(21) Appl. No.: 13/020,228

(22) Filed: Feb. 3, 2011

(65) Prior Publication Data

US 2012/0204065 A1    Aug. 9, 2012

(51) Int. Cl.
| | |
|---|---|
| *G06F 11/08* | (2006.01) |
| *G06F 11/14* | (2006.01) |
| *G06F 9/38* | (2006.01) |
| *G06F 12/08* | (2006.01) |
| *G06F 9/46* | (2006.01) |
| *G06F 9/52* | (2006.01) |

(52) U.S. Cl.
CPC .......... *G06F 11/1489* (2013.01); *G06F 9/3851* (2013.01); *G06F 9/466* (2013.01); *G06F 9/467* (2013.01); *G06F 9/528* (2013.01); *G06F 12/0842* (2013.01); *G06F 12/0846* (2013.01)

(58) Field of Classification Search
CPC .................................................... G06F 9/3851
USPC ......................................................... 712/228
See application file for complete search history.

(56) References Cited

U.S. PATENT DOCUMENTS

| | | |
|---|---|---|
| 5,434,995 A | 7/1995 | Oberlin et al. |
| 5,490,261 A | 2/1996 | Bean et al. |
| 5,706,464 A | 1/1998 | Moore et al. |
| 5,721,921 A | 2/1998 | Kessler et al. |

(Continued)

FOREIGN PATENT DOCUMENTS

| | | |
|---|---|---|
| JP | 2000215182 A | 8/2000 |
| WO | 96/37834 | 11/1996 |

OTHER PUBLICATIONS

Oplinger et al., "Enhancing Software Reliability with Speculative Threads", Dec. 2002, ACM, Proceedings of the 10th annual conference on Architectural Support for Programming Languages and Operating Systems, pp. 184-196.*

(Continued)

*Primary Examiner* — Andrew Caldwell
*Assistant Examiner* — Yuqing Xiao
(74) *Attorney, Agent, or Firm* — Scully, Scott, Murphy & Presser, P.C.; Anne V. Dougherty, Esq.

(57) ABSTRACT

A method for checking program correctness may include executing a program on a main hardware thread in speculative execution mode on a hardware execution context on a chip having a plurality of hardware execution contexts. In this mode, the main hardware thread's state is not committed to main memory. Correctness checks by a plurality of helper threads are executed in parallel to the main hardware thread. Each helper thread runs on a separate hardware execution context on the chip in parallel with the main hardware thread. The correctness checks determine a safe point in the program up to which the operations executed by the main hardware thread are correct. Once the main hardware thread reaches the safe point, the mode of execution of the main hardware thread is switched to non-speculative. The runtime then causes the main thread to re-enter speculative mode of execution.

21 Claims, 3 Drawing Sheets

(56) References Cited

U.S. PATENT DOCUMENTS

| | | | |
|---|---|---|---|
| 5,790,530 A | | 8/1998 | Moh et al. |
| 5,812,811 A | * | 9/1998 | Dubey et al. ............... 712/216 |
| 5,928,351 A | | 7/1999 | Horie et al. |
| 5,937,194 A | | 8/1999 | Sundaresan |
| 6,047,316 A | | 4/2000 | Barton et al. |
| 6,549,989 B1 | | 4/2003 | Arimilli et al. |
| 6,988,170 B2 | | 1/2006 | Barroso et al. |
| 7,100,021 B1 | | 8/2006 | Marshall et al. |
| 7,200,717 B2 | | 4/2007 | Guthrie et al. |
| 7,454,570 B2 | | 11/2008 | Dunshea et al. |
| 7,657,880 B2 | | 2/2010 | Wang et al. |
| 7,673,011 B2 | | 3/2010 | Archer et al. |
| 7,721,009 B2 | | 5/2010 | Moreira et al. |
| 7,734,706 B2 | | 6/2010 | Archer et al. |
| 7,793,044 B1 | | 9/2010 | Spracklen et al. |
| 8,307,194 B1 | | 11/2012 | Scott et al. |
| 2002/0147872 A1 | | 10/2002 | Steele et al. |
| 2002/0174299 A1 | | 11/2002 | Hayter et al. |
| 2004/0078493 A1 | | 4/2004 | Blumrich et al. |
| 2004/0154010 A1 | * | 8/2004 | Marcuello et al. ........... 717/158 |
| 2004/0154011 A1 | * | 8/2004 | Wang et al. ................. 717/158 |
| 2005/0027941 A1 | * | 2/2005 | Wang et al. ................. 711/121 |
| 2005/0097300 A1 | | 5/2005 | Gildea et al. |
| 2006/0161741 A1 | | 7/2006 | Yasue et al. |
| 2006/0184771 A1 | | 8/2006 | Floyd et al. |
| 2007/0006047 A1 | | 1/2007 | Zhou et al. |
| 2007/0113232 A1 | | 5/2007 | Collard et al. |
| 2007/0174558 A1 | | 7/2007 | Jia et al. |
| 2007/0180310 A1 | | 8/2007 | Johnson et al. |
| 2008/0077921 A1 | | 3/2008 | Chaudhary et al. |
| 2008/0178177 A1 | | 7/2008 | Archer et al. |
| 2008/0215861 A1 | | 9/2008 | Aamodt et al. |
| 2008/0282032 A1 | | 11/2008 | Shen et al. |
| 2008/0282064 A1 | * | 11/2008 | Day et al. ................... 712/35 |
| 2008/0288750 A1 | | 11/2008 | Clift et al. |
| 2009/0055627 A1 | | 2/2009 | Giacomoni et al. |
| 2009/0063811 A1 | | 3/2009 | Arimilli et al. |
| 2009/0070617 A1 | | 3/2009 | Arimilli et al. |
| 2009/0083493 A1 | | 3/2009 | Kinter |
| 2009/0172306 A1 | | 7/2009 | Nussbaum et al. |
| 2009/0193228 A1 | | 7/2009 | Kasahara et al. |
| 2009/0282474 A1 | | 11/2009 | Chen et al. |
| 2010/0088472 A1 | | 4/2010 | Ukai |

OTHER PUBLICATIONS

Prvulovic et al., "ReEnact: using thread-level speculation mechanisms to debug data races in multithreaded codes", May 2003, ACM, Proceedings of the 30th annual international symposium on Computer architecture, pp. 110-121 (reprinted pp. 1-12).*
Prvulovic et al., "ReVive: Cost-Effective Architectural Support for Rollback Recovery in Shared-Memory Multiprocessors", May 2002, ISCA '02 Proceedings of the 29th annual international symposium on Computer architecture, pp. 111-122.*
Mukherjee et al., "Detailed design and evaluation of redundant multithreading alternatives", May 2002, ISCA '02 Proceedings of the 29th annual international symposium on Computer architecture, pp. 99-110.*
Torrella, "Hardware Support for Reliability", 2003, University of Illinois at Urbana-Champaign, Enigneering, Course Material, CS 533, pp. 1-34.*
Patil et al., "Efficient Run-time Monitoring Using Shadow Processing", , May 1995, In Proceedings of the International Workshop on Automated and Algorithmic Debugging (AADEBUG), pp. 119-132, reprint pp. 1-14.*
International Search Report mailed Mar. 27, 2012 in corresponding International Application No. PCT/US2011/061683.
Nightingale et al., Parallelizing security checks on commodity hardware, Proceedings of the 2008 International Conference on Architectural Support for Programming Languages and Operating Systems (ASPLOS), Mar. 2008, pp. 308-318, URL http://www.eecs.umich.edu/~pmchen/papers/nightingale08.pdf.
Oplinger, Enhancing Software Reliability with Speculative Threads, Stanford University, Aug. 2004, pp. 1-111.
Li et al., Speculative Parallel Threading Architecture and Compilation, International Conference on Parallel Processing Workshops (ICPPW'05), Jun. 14-Jun. 17, 2005, pp. 285-294.
Narayanaswamy, G., et al., Impact of Network Sharing in Multi-Core Architectures, Computer Communications and Networks, 2008. ICCCN '08. Proceedings of 17th International Conference on Digital Object Identifier: 10.1109/ICCN.2008.ECP.61, Publication Year: 2008 , pp. 1-6.
Huang, W., et al., Efficient one-copy MPI shared memory communication in Virtual Machines, Cluster Computing, 2008 IEEE International Conference on Digital Object Identifier: 10.1109/CLUSTR.2008.4663761, Publication Year: 2008 , pp. 107-115.
Moreaud, S. et al., Optimizing MPI communication within large multicore nodes with kernel assistance, Parallel & Distributed Processing, Workshops and Phd Forum (IPDPSW), 2010 IEEE International Symposium on Digital Object Identifier: 10.1109/IPDPSW.2010.5470849, Publication Year: 2010 , pp. 1-7.
Rabenseifner, R. et al., Hybrid MPI/OpenMP Parallel Programming on Clusters of Multi-Core SMP Nodes, Parallel, Distributed and Network-based Processing, 2009 17th Euromicro International Conference on Digital Object Identifier: 10.1109/PDP.2009.43, Publication Year: 2009 , pp. 427-436.
Lin et al., A Low-Complexity Synchronization Based Cache Coherence Solution for Many Cores, IEEE Ninth International Conference on Computer and Information Technology, 2009, pp. 69-75, DOI 10.1109/CIT.2009.100.
Huang et al., Architecture Supported Synchronization-Based Cache Coherence Protocol for Many-Core Processors, Institute of Computing Technology, Chinese Academy of Sciences, pp. 1-3, Jun. 2008, Beijing, China.
Santhanaraman AL., Natively Supporting True One-sided Communication in MPI on Multi-core Systems with InfiniBand, 9th IEEE/ACM International Symposium on Cluster Computing and the Grid, 2009, pp. 380-387.
Kontothanassis et al., Software Cache Coherence for Large Scale Multiprocessors, IP Accession No. N95-16113, Report No. AD-A281628, TR-513, Contract: N00014-92-J-1801; ARPA Order 8930, Jul. 1994, p. 1-20.
Dios et al., Speeding-up Synchronizations in DSM Multiprocessors, Euro-Par 2006 Parallel Processing—12th International Euro-Par Conference, Proceedings, Lecture Notes in Computer Science (including subseries Lecture Notes in Artificial Intelligence and Lecture Notes in Bioformatics) (Lect. Notes Comput. Sci.), 2006, pp. 473-484, Germany.
Bolotin et al., The Power of Priority: NoC based Distributed Cache Coherency, Electrical Engineering Department, Technicon—Israel Institute of Technology (Haifa 32000, Isreal), 2007, pp. 1-10.
U.S. Office Action mailed Mar. 7, 2013 in related U.S. Appl. No. 13/008,498.
U.S. Office Action mailed Jun. 25, 2013 in related U.S. Appl. No. 12/986,528.
Pjesivac-Grbovic et al., Performance analysis of MPI collective operations, Mar. 15, 2007, Science Business Media LLC, p. 127-143.
U.S. Official Action mailed Jul. 23, 2013 in related U.S. Appl. No. 13/611,985.
Office Action dated Feb. 4, 2014 received in a related U.S. Patent Application, namely U.S. Appl. No. 12/987,523.
Office Action dated May 7, 2015 received in co-pending application, namely, U.S. Appl. No. 13/614,460.

* cited by examiner

METHOD FOR GUARANTEEING PROGRAM CORRECTNESS USING FINE-GRAINED HARDWARE SPECULATIVE EXECUTION

FIELD

The present application generally relates to computer architecture and more particularly to hardware processor execution.

BACKGROUND

Unmanaged languages, like C and C++, are inherently susceptible to memory-related errors that occur due to programming mistakes. Such errors cause numerous bugs that are difficult to detect, and they make applications vulnerable to malicious attacks that might, e.g., allow hostile parties to unlawfully take over the entire system. Memory errors therefore pose a serious problem during the development of an application and while it is in production.

There are various free and commercial tools that detect memory errors while applications are running. Example of such tools include: Insure++ of Parasoft™ Corporation in California, U.S.A., Purify of Rational from International Business Machines Corporation, Armonk, N.Y., and the open-source Valgrind project. Existing tools, for example, check that read operations are only performed on already-initialized memory and that write operations occur only within bounds. Some tools, however, introduce significant overhead and are therefore typically utilized only during development, not in production, potentially leaving yet-undetected errors.

Managed languages, like Java, C#, and Perl, employ a similar, built-in mechanism to check for memory errors; they therefore suffer from similar overheads. Both managed and unmanaged languages may enjoy a higher level of safety/correctness checks, such as the "taint mode" of Perl, which tracks all variable assignments to ensure that privileged applications are not unintentionally affected by inputs that may have been set by an unprivileged user. These checks likewise entail an overhead price.

The inventors of the present disclosure have recognized that one way to ameliorate the overhead is to have multiple tasks working in parallel checking for potential errors. The inventors of the present disclosure have also recognized that what is needed is a mechanism allowing fault detection to occur rapidly, in a fine-grained manner, with low overhead.

BRIEF SUMMARY

A method for checking program correctness, in one aspect, may include executing a program on a main hardware thread in speculative execution mode in which the main hardware thread's state is not committed to main memory. The main hardware thread may be executed on a hardware execution context in a computer system having a computer chip with a plurality of hardware execution contexts. The method may also include executing correctness checks by a plurality of helper threads. Each helper thread may be running on a separate hardware execution context on the chip in parallel with the main hardware thread. The correctness checks may determine a safe point in the program up to which operations executed by said main hardware thread are correct. The method may further include switching the main hardware thread's mode of execution to non-speculative at the safe point.

In another aspect, the method for checking program correctness may further include committing all main hardware thread's state to the main memory after switching the main hardware thread's mode of execution out of its speculative mode of execution. Yet in another aspect, the method may further include switching back the main hardware thread into speculative execution mode and continuing the executing of correctness checks by the plurality of helper threads until a next safe point is reached, wherein the main hardware thread is switched into non-speculative execution mode.

A system for checking program correctness, in one aspect, may include a plurality of hardware execution contexts on a computer chip. A main hardware thread may be executing a program in a speculative execution mode, on a first hardware execution context of the plurality of hardware execution contexts, wherein the main hardware thread's state is not committed to main memory. A plurality of helper threads may be executing program correctness checking on one or more second hardware execution contexts of the plurality of hardware execution contexts, the plurality of helper threads operable to determine a safe point in the program up to which operations executed by said main hardware thread are correct. The main hardware thread's mode of execution is switched to non-speculative at the safe point.

The system, in another aspect, may also include a memory hierarchy including at least a cache memory local to the chip and the main memory, wherein the main hardware thread's state during speculative execution is saved in the cache memory, and only committed to the main memory after the main hardware thread's mode of execution is switched to non-speculative. Yet in another aspect, the main hardware thread's execution mode is switched back to speculative execution mode and the plurality of helper threads continue to execute correct checking until next safe point is determined.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
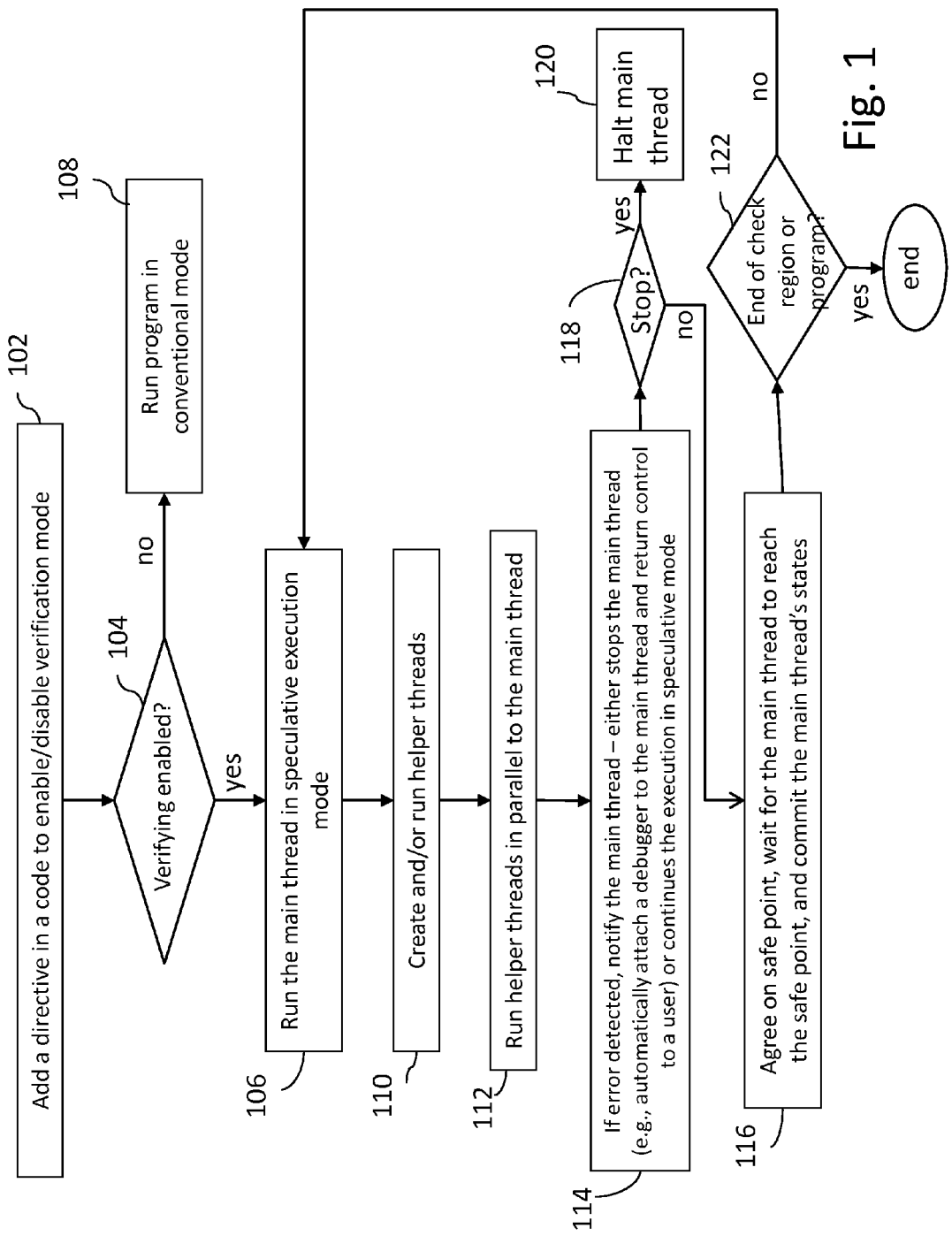
FIG. 1 illustrates a method for hardware speculative execution in one embodiment of the present disclosure.

A mechanism is described in one embodiment that uses speculative execution in order to reduce the performance impact of the correctness checks. The mechanism of the present disclosure in one embodiment may reduce the impact of the overhead incurred in checking for memory errors, by leveraging hardware speculation via a multi-valued cache. In one embodiment of the present disclosure, the "main" thread (the application's code without correctness checks) may be run speculatively, while other "helper" threads perform the associated correctness checks in parallel, at fine granularity, when the need arises. The main thread ceases to be speculative if and/or when the helper threads approve; otherwise (correctness check failed), the main thread's current block of speculative execution is cancelled, leaving the system in a sane state and ensuring that the (speculative) erroneous operation has no unwarranted side effects. In addition, the helper threads may report the error to the user.

Speculative execution or operation or task, refers to execution in which a process or thread executes program instructions without committing the state of the program to the permanent memory.

Support for memory speculation or speculative execution may be provided by hardware architecture that may include a computer chip (integrated circuit die) having a plurality of processor cores each with a plurality of hardware threads. Other elements may be provided on the chip. The speculative multithreading support allows for assigning different speculative tasks to each of the hardware threads. The term thread may refer to either the hardware (normally referred to as hardware threading or SMT (symmetric multithreading), including the execution units, register state, etc. associated with a set of hardware capable of executing a series of instructions, or refers to the software construct that runs on the hardware. A thread therefore is an entity capable of running an instruction stream. Multiple software threads may be multiplexed on a single hardware thread. When referring to threads, the term older/younger or earlier/later refers to their relative program order (not the time they actually run on the hardware).

In speculative execution, successive sections of sequential code, or successive iterations in a loop, are assigned to hardware threads to run simultaneously. Each thread has the illusion of executing its task in program order. It sees its own writes and writes that occurred earlier in the program. If the hardware detects (because of different speculative threads touching the same memory) the program executes memory references that violate being able to make it appear that the original program execution order occurred, the hardware will kill that and subsequent speculative threads, and run the code sequentially.

To accomplish this task, the L2 provides the ability to allow multiple value to be stored at any given memory address. Thus, the L2 might have several different data values for a single address. Each occupies an L2 way, and the L2 directory records, in addition to the usual directory information, a history of which threads have read or written the line. A speculative write is not allowed to be written out to main memory.

In one embodiment, one situation that will break program-order may be if a thread earlier in program order writes to an address that a thread later in program order has already read. The later thread should have read that data, but did not. A solution is to kill the later thread and invalidate all the lines it has written in L2, and to repeat this for all younger threads. On the other hand, if no such interference occurs, a thread can complete successfully, and its writes can move to external main memory when flushed commit that ends the speculation occurs.

Not all threads need to be speculative. The running thread earliest in program order can execute as non-speculative and runs conventionally; in particular its writes can go directly to external main memory. The reads later in program order are speculative and are subject to be killed. When the non-speculative thread completes, the next-oldest thread state can be committed and it then starts to run non-speculatively.

The following algorithm may implement efficient helper thread verification utilization of the above described speculative execution in one embodiment of the present disclosure.

1. User adds a directive into the user's code for regions a user wishes to verify with this technique.
   1a. The directives can remain always in the code and can be enabled/disabled via compiler flags and/or environment variables.
2. If the compiler flag/environment variable indicates the user's desire to run with correctness checking the following steps 3-6 are taken, otherwise the program executes normally without any additional code running (or perturbation to the behavior).
3. The runtime environment causes the main thread to enter speculative execution.
4. The runtime environment starts helper threads to perform a user selectable set of checks.
   4a. In the event one of the helper threads detects a problem, the main thread is halted, the runtime queries the state of the helper threads to gather debug information and control is optionally returned to the user to make a more careful examination of the detected failure, or optionally, the program continues with a log made of the detected check failure.
5. At stable points (defined by when all checks have proven successful, and there are no outstanding operations), the runtime environment commits (exits speculative execution) the main thread's updates and tracking information and then re-enters speculation for the main thread. The main thread exits and re-enters speculation because the amount of state information for speculative execution may eventually overflow and cause a speculative failure.
6. The main thread continues in this mode until it encounters a user directive indicating the end of the region of code to check, or the program finishes normally.

FIG. 1 illustrates a method for checking for potential error conditions by utilizing the hardware speculative execution in one embodiment of the present disclosure. In one embodiment, the method may be implemented using an integrated circuit die (chip) having multiple hardware execution contexts and memory hierarchy. A hardware execution context refers to a processor's capacity to schedule a thread of execution. Multiple hardware execution contexts may be manifested by having multiple cores on a chip. A core may include a logical execution unit having L1 cache and functional units and has the capability to independently execute threads. A memory hierarchy may be organized in the following manner: L1 cache memory local to each core, L2 cache memory shared among a group of cores, main memory, and disk storage in the order of low to high in the hierarchy. The method in one embodiment includes executing a plurality of threads on the plurality of hardware contexts respectively, uses the memory hierarchy to make at least one of the threads speculative, and dynamically checks a correct execution of a program. The method of the present disclosure in one embodiment may be initiated or started as a directive inserted in a program code, for instance, by a programmer. A compiler runtime environment, or the like, detects the directive and enables the methodology of the present disclosure to take place during the program execution. For instance, software such as the compiler (or the like) may set a flag which the runtime environment of the program may recognize and initiate the methodology of the present disclosure.

Referring to FIG. 1, a user may add a directive into a program code for the regions the user would like to verify at 102. The directive may remain in the code, and may be enabled or disabled by using a compiler flag and/or environment variables. At 104, if the compiler flag or environment variable indicates the verifying methodology is to be enabled, at 106, the runtime environment causes the main thread executing the program code to enter speculative execution. In this execution mode (speculative execution), the program's data are not written out to the main memory. Otherwise at 104 if the compiler flag or environment variable indicates the verifying methodology is to be disabled, the program may take the conventional execution path at 108.

At 110, the runtime environment spawns one or more hardware helper threads to perform a user selected set of checks. The number of helper threads spawned may depend on the size or characteristic of the regions of the program that are set for checking. At 112, each helper thread runs in its own context on a hardware processor core and runs in parallel to the main program thread. Each helper thread moves through the code (the region it is assigned to check) checking for any error conditions in the code. In this way, the main thread is not slowed down with the additional tasks of checking for errors.

At 114, if a helper thread detects an error condition, the helper thread may communicate the error to the runtime, which in turn may halt the execution of the main thread. Debug information may be gathered and logged (recorded) and control may be returned to the user to analyze the detected error, e.g., as shown at 118 and 120. If the main thread's execution is halted, the runtime environment may automatically attach a debugger to the main thread and return the control to the user. In another aspect, the helper thread may log the detected error, but allow the main thread to continue with its processing. This may be the case if the detected potential failure is not severe or critical to the running of the main thread. This determination may be made by a user settable set of preferences and is impacted by how severe the detected error is. For example, for errors that are severe enough to be non-recoverable, or for which the user has not provided an exception handler, if the user preferences indicate to log error and continue, when the main program resumes execution, the main program might crash and be abnormally terminated.

At 116, the helper threads have all reached a safe point, which the main thread can reach without any errors, and the helper threads communicate this information to the runtime environment. The runtime environment checks for the main thread to get to that safe point. Once the main thread reaches the safe point, the runtime environment takes the main thread out of its speculative execution mode. The main thread's state (e.g., computations and memory writes performed by the main thread during the speculative execution up to that safe point) is committed to main memory.

Once the main thread's state is committed, the runtime environment again runs the main thread in speculative execution mode (in which the main thread's state is not committed to main memory) as in 106. The runtime environment also runs one or more helper threads in parallel with the main thread as in 112. Because the main thread is running speculatively, the helper threads execute code and check in the same block of code as the main thread is running. These helper threads can check for a user selectable set of conditions such as divide by zero, out of array bounds, null pointer dereference, memory leaks, reference to undefined memory, or any of the additional checks (for instance, those provided in the existing tools).

The processing continues to 112 in which the main thread runs speculatively and the helper threads run in parallel with the main thread checking for errors. The steps 106 to 116 may continue until the main thread encounters a user directive indicating the end of the region of code to check or the program finishes, e.g., as shown at 122.

Safe points or a stable point at which the main thread may stop its speculative mode of execution may be points in the code (program) that performs messaging instructions or input/output operations. The end of the check region or the program may be also considered a safe point. An end of a basic block of program execution may be also determined as a safe point. The points in the program where it executes some action that has consequences outside of the node (chip), such as sending a message, performing I/O, or over-flowing the cache level where speculative state is stored are also selected as safe points in one embodiment of the present disclosure. The former two are well defined points in the program, the latter may not be known. However, in one embodiment of the present disclosure, the hardware provide a signal when it is one entry away from over-flowing the L2 cache so that the runtime may force a safe point at the place in the program's execution.

Other safe points may be determined. More frequent safe points provide for less skew between the main thread and the helper threads and make it less likely some external event causes a termination of the checking. However, there may be a cost associated with exiting and re-entering speculation, in addition to synchronizing the helper threads.

In another aspect, a report may be generated of the error conditions detected by the helper threads.

Figure 2:
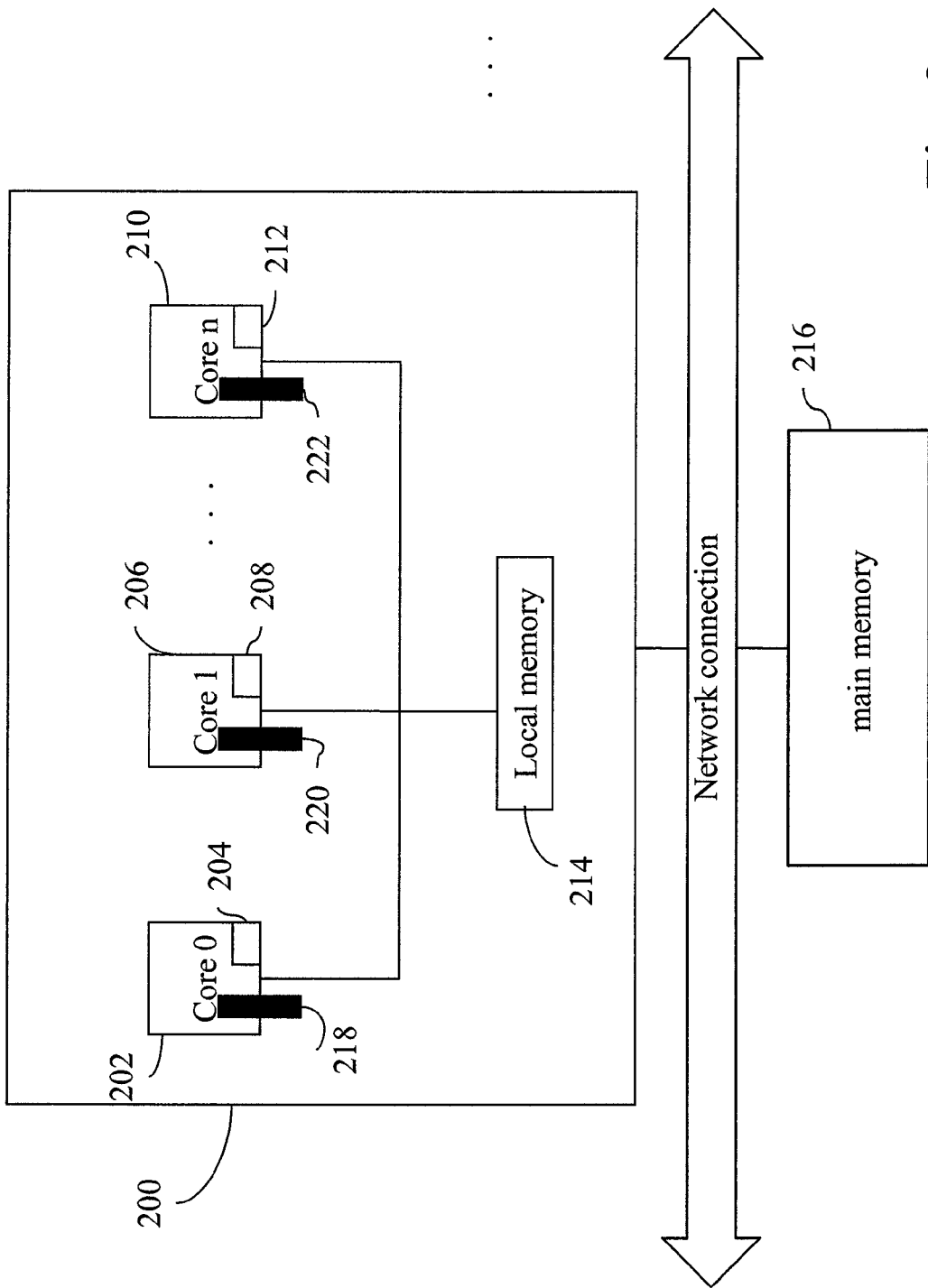
FIG. 2 is a block diagram illustrating a system for fine-grained hardware speculative execution for program correctness checking, in one embodiment of the present disclosure.

FIG. 2 is a block diagram illustrating a system for fine-grained hardware speculative execution for program correctness checking, in one embodiment of the present disclosure. An integrated circuit die (chip) 200 may include a plurality of cores (also referred to as processing cores). A core 202 may include a functional unit and cache memory 204, for example, L1 cache memory, local to that core 202. Each core is capable of running a plurality of hardware threads. For example, the core 202 is capable of running a hardware thread 218. Similarly, a core 206 may include a functional unit and cache memory 208, for example, L1 cache memory, local to that core 206. The core 206 is capable of running a hardware thread 220. Likewise, a core 210 may include a functional unit and cache memory 212, for example, L1 cache memory, local to that core 210. The core 210 is capable of running a plurality of hardware threads 212. The chip 200 may also include memory 214 local to the chip 200, for example, an L2 cache memory, which may be shared among the plurality of cores on the chip. The chip is connected to a main memory 216, which, for example, may be a synchronous dynamic random access memory (SDRAM). The chip 200 may be part of a computer system which has a plurality of the same or different integrated circuits connected via a network connection.

A main thread of a program, which is being verified, may run as one hardware thread, e.g., 218 on core 202. A helper threads may be spawned and executed on the same or a different core. For instance, a helper thread 220 may be executing on core 202 or 208; another helper thread 222 may be executing on core 210. The main thread 218 runs through the program instructions in a speculative execution mode. That is, the data writes performed during this mode of execution are not committed to memory. At the same time or in parallel, one or more helper threads 220, 222 run through pieces of program instructions and check for error conditions in the code. If a helper thread (e.g., 220 and/or 222) detects an error in the code, the helper thread logs the error condition and sends notification of the error to the runtime, which in turn may halt the execution of the main thread depending on the type of detected error.

Once the helper threads (220, 222) come to a safe point or stable point in the program (code), without detecting any error, they either exit or wait for the main thread to reach the same safe point. After the main thread reaches the safe point, the main thread is switched out of the speculative execution mode, and the state of the main thread is committed from local memory 214 to the main memory 216. Once the state is committed to the main memory 216, the main thread is again placed into a speculative execution mode, wherein the state of the main thread is not written out to the main memory 216 but only saved in local memory 214, and until the helper threads reach the next safe point. This process continues until the end of code or end of check region is reached in the program execution.

The performance costs of switching into and out of speculation are relatively small. This allows rapid and frequent synchronization between the helper threads and the main thread. Some of the helper threads may even run on the same core, but different hardware threads, as the main thread. With these mechanisms, because the creation and re-integration of a helper thread with the main thread is lightweight new capabilities are enabled. Helper threads may be created as the need arises dynamically, rather than planned for ahead of time and interacted with infrequently. In addition to the standard type of checks, this allows for more nimble and reactive checks to be instantiated.

Figure 3:
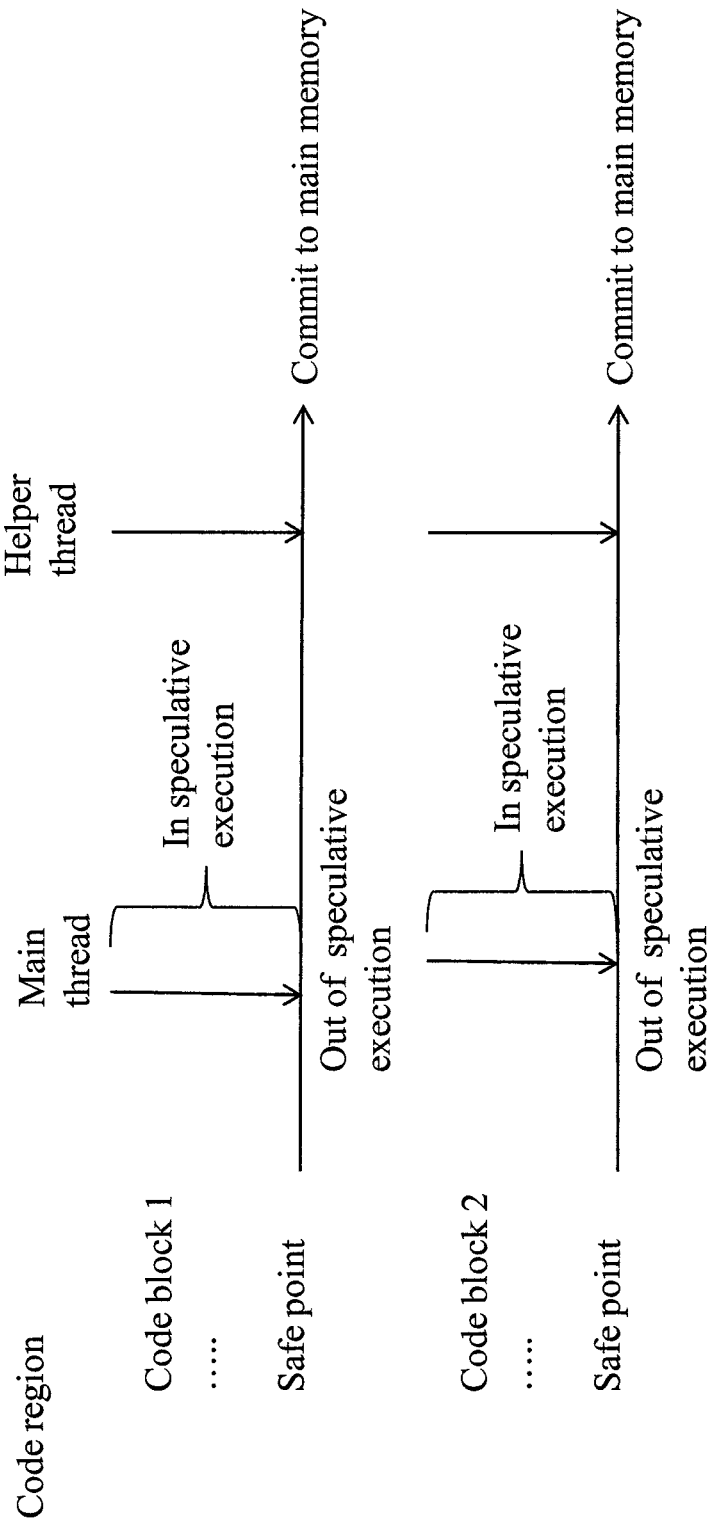
FIG. 3 illustrates a main thread and a helper thread running in parallel. The main thread executes a block of code until a safe point is reached speculatively.

FIG. 3 illustrates a main thread and a helper thread running in parallel. The main thread executes a block of code until a safe point is reached speculatively. The helper thread checks for error conditions, and determines a safe point at which the main thread is switched out of the speculative execution mode. The main thread's states during the speculative execution are committed to main memory. Then next block of code is executed by the main thread, again in speculative execution mode, while the helper thread is checking for error conditions in this block of code. At the next safe point, the main thread is kicked out of the speculative execution mode, and its states get committed to main memory. The process continues until the end of the code or end of the check region in the code.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The systems and methodologies of the present disclosure may be carried out or executed in a computer system that includes a processing unit, which houses one or more processors and/or cores, memory and other systems components (not shown expressly in the drawing) that implement a computer processing system, or computer that may execute a computer program product. The computer program product may comprise media, for example a hard disk, a compact storage medium such as a compact disc, or other storage devices, which may be read by the processing unit by any techniques known or will be known to the skilled artisan for providing the computer program product to the processing system for execution.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The computer processing system that carries out the system and method of the present disclosure may also include a display device such as a monitor or display screen for presenting output displays and providing a display through which the user may input data and interact with the processing system, for instance, in cooperation with input devices such as the keyboard and mouse device or pointing device. The computer processing system may be also connected or coupled to one or more peripheral devices such as the printer, scanner, speaker, and any other devices, directly or via remote connections. The computer processing system may be connected or coupled to one or more other processing systems such as a server, other remote computer processing system, network storage devices, via any one or more of a local Ethernet, WAN connection, Internet, etc. or via any other networking methodologies that connect different computing systems and allow them to communicate with one another. The various functionalities and modules of the systems and methods of the present disclosure may be implemented or carried out distributedly on different processing systems or on any single platform, for instance, accessing data stored locally or distributedly on the network.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method for checking program correctness, comprising:
executing a program on a main hardware thread in speculative execution mode in which the main hardware thread's state is not committed to main memory, the main hardware thread executed on a hardware execution context in a computer system having a computer chip with a plurality of hardware execution contexts, the main hardware thread executing the program without correctness checks;
spawning a plurality of helper threads to perform user selected set of checks, a number of the plurality of helper threads spawned based on at least a size of a region of the program set for checking;
executing correctness checks by the plurality of helper threads, each helper thread running on a separate hardware execution context on the chip in parallel with the main hardware thread, wherein the plurality of helper threads execute code and check in a same block of the program the main hardware thread is executing, at least one of the plurality of helper threads running on a second core that is different from a first core that is running the main hardware thread, said plurality of threads determining a safe point in the program up to which said main hardware thread can reach without error at least by checking a multi-valued L2 cache, wherein the multi-valued L2 cache is configured to store multiple different data values for a single address and an L2 directory records a history of which threads have read or written a cache line, and communicating the safe point to a program runtime; and
switching the main hardware thread's mode of execution to non-speculative at the safe point, the method further comprising switching back the main hardware thread into speculative execution mode and continuing the executing of correctness checks by the plurality of helper threads until a next safe point is reached, wherein the main hardware thread is switched into non-speculative execution mode.

2. The method of claim 1, wherein the switching the main hardware thread's mode of execution to non-speculative at the safe point further includes committing all main hardware thread's states to main memory.

3. The method of claim 2, wherein the main hardware thread's state during speculative execution is stored in a cache memory local to the chip.

4. The method of claim 1, wherein said safe point is determined to be an end of a program block, sending a message, an input/output (I/O) operation, overflowing said cache, or combinations thereof.

5. The method of claim 1, wherein the steps are performed in response to detecting a user directive in a compiler to verify the program.

6. The method of claim 1, wherein in response to detecting an error by one or said plurality of helper threads, the main hardware thread halts execution of the program.

7. The method of claim 1, wherein the steps are repeated until the program finishes or end of region for checking correctness is reached in the program.

8. The method of claim 1, wherein said correctness checks include checking for divide by zero, out of array bounds, null pointer dereference, memory leaks, reference to undefined memory, or combinations thereof.

9. The method of claim 1, wherein responsive to at least one of the helper threads communicating an error, halting the main thread's execution and automatically attaching a debugger to the main thread and returning control to a user.

10. A non-transitory computer readable storage medium storing a program of instructions executable by a machine to perform a method of checking program correctness, the method comprising:
executing a program on a main hardware thread in speculative execution mode in which the main hardware thread's state is not committed to main memory, the main hardware thread executed on a hardware execution context in a computer system having a computer chip with a plurality of hardware execution contexts, the main hardware thread executing the program without correctness checks;
spawning a plurality of helper threads to perform user selected set of checks, a number of the plurality of helper threads spawned based on at least a size of a region of the program set for checking;
executing correctness checks by the plurality of helper threads, each helper thread running on a separate hardware execution context on the chip in parallel with the main hardware thread, wherein the plurality of helper threads execute code and check in a same block of the program the main hardware thread is executing, at least one of the plurality of helper threads running on a second core that is different from a first core that is running the main hardware thread, said plurality of threads determining a safe point in the program up to which said main hardware thread can reach without error at least by checking a multi-valued L2 cache, wherein the multi-valued L2 cache is configured to store multiple different data values for a single address and an L2 directory records a history of which threads have read or written a cache line, and communicating the safe point to a program runtime; and
switching the main hardware thread's mode of execution to non-speculative at the safe point.

11. The computer readable storage medium of claim 10, wherein the switching the main hardware thread's mode of execution to non-speculative at the safe point further includes committing all main hardware thread's states to main memory.

12. The computer readable storage medium of claim 11, further including:
switching back the main hardware thread into speculative execution mode and continuing the executing of correctness checks by the plurality of helper threads until a next safe point is reached, wherein the main hardware thread is switched into non-speculative execution mode.

13. The computer readable storage medium of claim 12, wherein the main hardware thread's state during speculative execution is saved in a cache memory local to the chip.

14. The computer readable storage medium of claim 10, wherein said safe point is determined to be an end of a program block, sending a message, an input/output (I/O) operation, or combinations thereof.

15. The computer readable storage medium of claim 10, wherein the steps are performed in response to detecting a user directive in a compiler to verify the program.

16. The computer readable storage medium of claim 10, wherein in response to detecting an error by one or said plurality of helper threads, the main hardware thread halts execution of the program.

17. The computer readable storage medium of claim 10, wherein the steps are repeated until the program finishes or end of region for checking correctness is reached in the program.

18. A system for checking program correctness, comprising:
a plurality of hardware execution contexts on a computer chip;
a main hardware thread executing a program in a speculative execution mode, on a first hardware execution context of the plurality of hardware execution contexts, the main hardware thread including execution units and register states associated with a set of hardware capable of executing a series of instructions, the main hardware thread executing the program without correctness checks, wherein the main hardware thread's state is not committed to main memory; and
a plurality of helper threads executing program correctness checking on one or more second hardware execution contexts of the plurality of hardware execution contexts, wherein the plurality of helper threads execute code and check in a same block of the program the main hardware thread is executing, the plurality of helper threads spawned to perform user selected set of checks, a number of the plurality of helper threads spawned based on at least a size of a region of the program set for checking, at least one of the plurality of helper threads running on a second core that is different from a first core that is running the main hardware thread, the plurality of helper threads operable to determine a safe point in the program up to which said main hardware thread can reach without error at least by checking a multi-valued L2 cache, wherein the multi-valued L2 cache is configured to store multiple different data values for a single address and an L2 directory records a history of which threads have read or written a cache line, and communicating the safe point to a program runtime,
wherein the main hardware thread's mode of execution is switched to non-speculative at the safe point.

19. The system of claim 18, further including:
a memory hierarchy including at least a cache memory local to the chip and the main memory, wherein the main hardware thread's state during speculative execution is saved in the cache memory, and only committed to the main memory after the main hardware thread's mode of execution is switched to non-speculative.

20. The system of claim 19, wherein the main hardware thread's execution mode is switched back to speculative execution mode and the plurality of helper threads continue to execute correctness checking until next safe point is determined.

21. The system of claim 20, wherein said safe point is determined to be an end of a program block, sending a message, an input/output (I/O)operation, or combinations thereof.

* * * * *